(12) United States Patent
Narumi et al.

(10) Patent No.: US 6,301,892 B1
(45) Date of Patent: Oct. 16, 2001

(54) ELECTRIC IGNITION TYPE GAS GENERATION APPARATUS

(75) Inventors: Kazuhito Narumi; Ikuo Araki; Hiroki Morinaga, all of Ibaraki-ken (JP)

(73) Assignee: Showa Kinzoku Kogyo Co., Ltd., Nishiibaraki-gun (JP)

( * ) Notice: Subject to any disclaimer, the term of this patent is extended or adjusted under 35 U.S.C. 154(b) by 0 days.

(21) Appl. No.: 09/545,927

(22) Filed: Apr. 10, 2000

(30) Foreign Application Priority Data

Apr. 9, 1999 (JP) ................................... 11-102092

(51) Int. Cl.[7] ...................................................... F01B 29/08
(52) U.S. Cl. ................................... 60/634; 60/636; 60/638
(58) Field of Search ............................... 60/632, 638, 634, 60/636

(56) References Cited

U.S. PATENT DOCUMENTS

| 4,045,959 | * | 9/1977 | Burns | 60/632 |
| 4,054,032 | * | 10/1977 | Patrichi | 60/632 |
| 5,672,841 | * | 9/1997 | Monk et al. | 102/202.4 |
| 5,763,814 | * | 6/1998 | Avory et al. | 60/632 X |
| 5,811,752 | * | 9/1998 | Titus et al. | 219/121.27 |

* cited by examiner

Primary Examiner—Hoang Nguyen
(74) Attorney, Agent, or Firm—Oblon, Spivak, McClelland, Maier & Neustadt, P.C.

(57) ABSTRACT

An electric ignition type gas generation apparatus for use in a vehicle crash safety system includes an ignition section that is ignited by an electric signal produced by the impact of a crash, and a gas generating section in which burning gas is generated by the ignition of the ignition section. The ignition section is formed on the base of the apparatus, and the gas generating section is disposed on the base over the ignition section.

2 Claims, 5 Drawing Sheets

ELECTRIC IGNITION TYPE GAS GENERATION APPARATUS

BACKGROUND OF THE INVENTION

1. Field of the Invention

This invention relates to an electric ignition type gas generation apparatus that has an ignition section that is ignited by an electric signal, and a gas generating section in which burning gas is generated by the ignition of the ignition section. This invention particularly relates to an improved electric ignition type gas generation apparatus for instantaneously operating a vehicle safety device such as a seatbelt or airbag.

2. Description of the Prior Art

Cars and other vehicles are normally provided with safety devices such as seatbelts and airbags for protecting the driver and passengers from the impact of a crash. In the case of a seatbelt system, for example, the belt is equipped with a rapid retraction means that is activated in a crash or the like to protect the wearer from the shock of the crash impact. Most such rapid retraction means are comprised of a gas generating device in which the gas is generated by the ignition of a gunpowder charge. In a crash, the shock of the impact is used to electrically or mechanically operate an igniter to ignite the gas generating material. The pressure generated by the ignition of the gas is used to instantaneously drive a cylinder piston or rotor to rapidly retract the belt.

FIG. 5 shows an example of a conventional gas generation apparatus of this type. This apparatus has a base A to which are attached an electric igniter B and a cylindrical outer casing C. As shown in FIG. 6, the electric igniter B is formed as a single unit that includes a pair of electrode pins E in a resin holder D. Each of these electrode pins E passes through the holder D, one end of each electrode pin E thereby extending out from the holder D, while the other end of each of the electrode pins E is connected to a filament or other such resistance (not shown) on a printed circuit board F. This resistance on the printed circuit board F constitutes an ignition section B'. The outer surface of the ignition section B' is covered by a priming charge G, over which is then attached a resin cup J filled with an ignition charge H. A metal casing K is fitted over the resin cup J. In the peripheral surface of the casing K is an aperture L through which the flame of the combustion propagates. The electric igniter B is inserted into a through-hole M provided in the base A and attached to the base A by means of the holder D.

The cylindrical outer casing C is formed of a metal such as aluminum or stainless steel and has a bottom that can readily be opened by the pressure of the burning gases. After being filled with the gas generating material N, the outer casing C is attached to the base A with the ignition section B' covering the igniter B. The reference symbol shown in FIG. 5 denotes a moistureproof, pressure-resistant vulcanized rubber O-ring disposed between the holder D and the base A.

When the vehicle with the gas generation apparatus having the above structure is involved in a crash, the impact of the crash is communicated as an electric signal to the electrode pins E. This causes the resistance (not shown) between the electrode pins E to heat up, igniting the priming charge G and thereby setting off the ignition charge H. When the flame of the combustion reaches gas generating material N via the aperture L, the gas generating material N starts to burn. The burning gas produced by the burning of the gas generating material N ruptures the bottom of the outer casing C and is thereby instantaneously released to the outside. The pressure generated by this burning gas instantaneously activates the seatbelt rapid retraction means or airbag.

In the conventional gas generation apparatus described above, the fact that the electric igniter B is prefabricated as a unit enables the assembly procedure to be simplified. However, in order to handle the electric igniter B as a single component, it is necessary to cover the ignition section B' with the resin cup J and the metal casing K, in addition to which the holder D that supports the electrode pins E has to be separate from the base A. Thus, this configuration markedly increases the number of parts of the gas generation apparatus, increasing the cost. Moreover, the major portion of the gas generation apparatus that includes the ignition section B' projects into the center of the outer casing C. As a result, in order to obtain the requisite gas pressure the volume of the outer casing C has to be increased, making the apparatus much larger. Also, the fact that the ignition section B' projects into the center of the outer casing C prevents the gas generating material N from burning uniformly. Therefore, to obtain the required gas pressure it is necessary to pack the outer casing C with an extra amount of gas generating material N, further increasing the size of the apparatus.

An object of the present invention is therefore to provide an electric ignition type gas generation apparatus that is smaller and less costly.

SUMMARY OF THE INVENTION

For attaining the above object, the present invention provides an electric ignition type gas generation apparatus comprising an ignition section that is ignited by an electric signal and a gas generating section in which burning gas is generated by the ignition of the ignition section, said electric ignition type gas generation apparatus being characterized in that the ignition section is formed on an apparatus base, and the gas generating section is provided on the base for covering the ignition section.

The object is also attained by a gas generation apparatus according to the invention in which the ignition section includes a pair of electric signal input portions that are connected to each other by a varistor.

The gas generation apparatus of the invention further includes a gas generating section having an unvulcanized rubber seal.

As described in the foregoing, since in accordance with this invention an ignition section is formed on a base, and the base is provided with a gas generating section that covers the ignition section, it is possible to reduce the number of parts, the cost and the size of the apparatus. When applied to a rapid retraction device of a seatbelt or an airbag or other such vehicle safety device, or to an airbag device used to protect people from the shock of falls, rolling and other such crash impacts, it enables the cost and size of such devices to be reduced. Moreover, using a varistor to provide a connection between the electric input portions of the ignition section and using unvulcanized rubber as a seal material for the gas generating section improves the reliability of the apparatus by improving the resistance to static electricity and the moistureproof properties.

Further features of the invention, its nature and various advantages will become more apparent from the accompanying drawings and following detailed description of the invention.

DESCRIPTION OF THE PREFERRED EMBODIMENTS

Embodiments of the present invention will now be described in detail with reference to the drawings.

Figure 1:
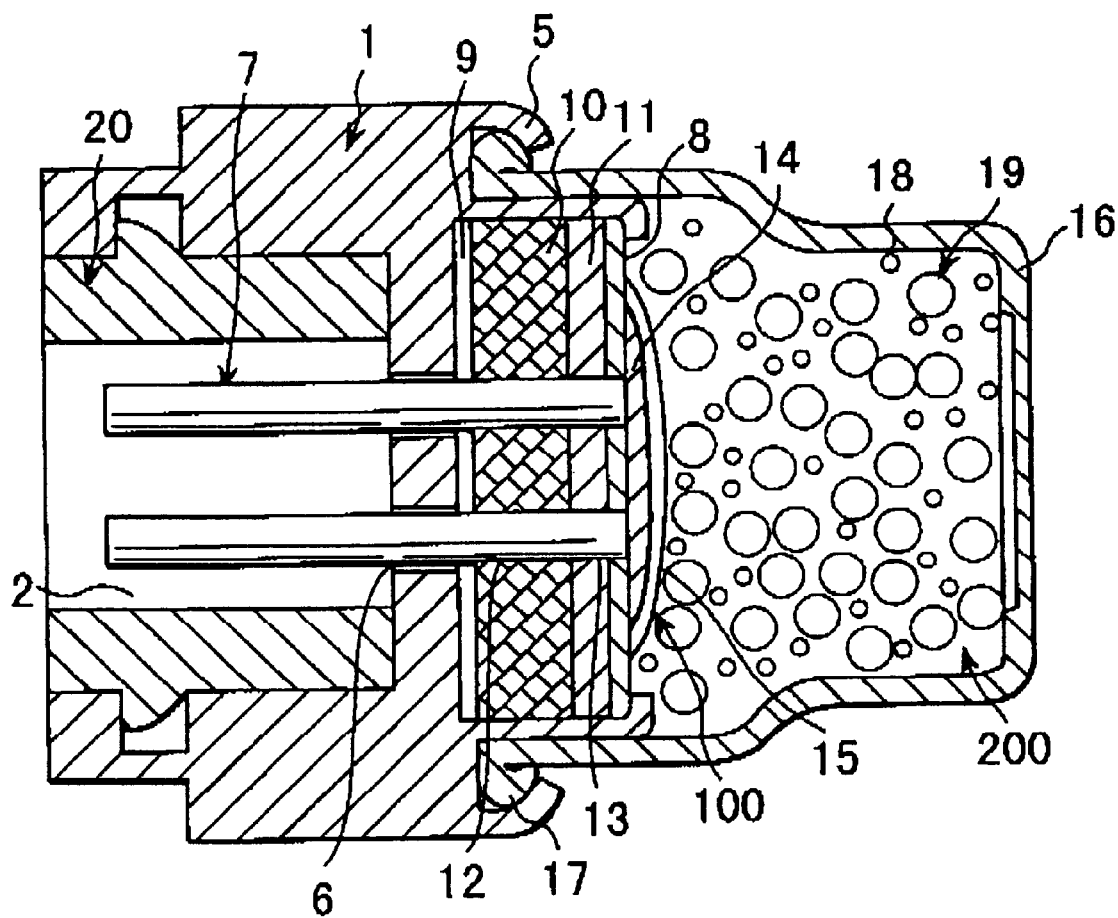
FIG. 1 is a cross-sectional diagram of a first embodiment of the electric ignition type gas generation apparatus according to the invention.

FIG. 1 illustrates an electric ignition type gas generation apparatus that is a first embodiment of the invention. The gas generation apparatus shown here is intended for use with a seatbelt, airbag or other such vehicle safety device described above, and comprises a base 1 formed of aluminum. At one end the base 1 has a connector socket 2 and at the other end a seat 3 used to form an ignition section. Around the seat 3 are a peripheral wall 4 for attaching the ignition section and a peripheral wall 5 for attaching a casing. The seat 3 has a flat face and a pair of centrally disposed pin insertion holes 6. The pin insertion holes 6 are parallel and open to the connector socket 2.

Mounted on the seat 3 is a printed circuit board 8 that includes a pair of electrode pins 7. The electrode pins 7 are cylindrical, conductive members having a diameter that is smaller than that of the pin insertion holes 6. At the base end, the electrode pins 7 are electrically connected together via a resistance (not shown) such as a filament or the like mounted on the printed circuit board 8. The other ends of the electrode pins 7 extend in parallel from the rear surface of the printed circuit board 8. The electrode pins 7 reach to the connector socket 2 via the pin insertion holes 6 and a seal material 9, hermetic material 10 and a varistor 11 disposed between the printed circuit board 8 and the seat 3. The seal material 9 is formed of unvulcanized butyl rubber sheet or unvulcanized ethylene propylene diene terpolymer (EPDM) rubber sheet. The hermetic material 10 is formed of insulating resin and has pin holes 12 at a position corresponding to the pin insertion holes 6. The varistor 11 is of ceramic and is in contact with the electrode pins 7 via the peripheral surface of pin holes 13.

The above parts are attached to the base 1 in the following order. First, the electrode pins 7 are inserted into the pin holes 12 in the hermetic material 10. Then, the varistor 11 and the printed circuit board 8 are mounted on the end of the electrode pins 7, and a resistance (not shown) on the printed circuit board 8 is soldered across the electrode pins 7 to mutually connect the electrode pins. Finally, after the seal material 9 is adhered to the rear surface of the hermetic material 10 and the electrode pins 7 are inserted into the pin insertion holes 6 in the base 1, the peripheral wall 4 used for attaching the ignition section is caulked to affix the parts to the base 1. In this state, the rim of the varistor 11 is connected to the base 1 via the peripheral wall 4.

The ignition section 100 of the gas generation apparatus is formed by disposing a priming charge 14 on the resistance of the printed circuit board 8. The priming charge 14 may be thus disposed by dripping a wet charge onto the printed circuit board 8 and then drying the charge, or a dry charge may be used as it is. It is preferable to coat the priming charge 14 with paste 15. An outer casing 16 is provided around the ignition section 100. The outer casing 16 is formed of aluminum or stainless steel in the shape of a stepped cylinder with a bottom. The opening of the outer casing 16 has a larger diameter than the bottom; the opening of the outer casing 16 has an inside diameter that allows the outer casing 16 to be fitted onto the peripheral wall 4. The outer casing 16 has a thin bottom or the bottom is radially grooved or the like to enable it to readily allow pressure generated by the burning gas to be released. The rim of the opening of the outer casing 16 is turned to form a flange 17.

After the interior of the outer casing 16 is filled with a mixture of prescribed amounts of an ignition charge 18 and a gas generating material 19, it is attached to the base 1 over the ignition section 100 to thereby constitute the gas generation section 200 of the gas generation apparatus. With this configuration, the outer casing 16 can be readily affixed to the base 1 by using the peripheral wall 5 to caulk the flange 17, and the varistor 11 between the printed circuit board 8 and the hermetic material 10 can be connected to the outer casing 16 via the base 1. It is preferable to use a sealant between the flange 17 and the peripheral wall 5 such as liquid rubber that sets at room temperature. Reference numeral 20 in FIG. 1 denotes a shunt ring that shorts out the electrode pins 7 when the apparatus is not in use, and unshorts the electrode pins 7 when a connector is inserted into the connector socket 2. When the gas generation apparatus thus constituted has been attached to the vehicle safety system, the connector is connected using an electric signal output line (not shown) to the electrode pins 7.

When the vehicle is in a crash, the impact sends an electric signal to the electrode pins 7, heating up the resistance (not shown) between the electrode pins 7. This ignites the priming charge 14, setting off the ignition charge 18 and the gas generating material 19. The pressure produced by the combustion of the gas generating material 19 ruptures the bottom of the outer casing 16 and is thereby instantaneously released to the outside, instantaneously activating the seatbelt rapid retraction means, airbag or other such vehicle safety system.

In accordance with the above gas generation apparatus, the varistor 11 is used to provide an electric connection between the electrode pins 7 and between the electrode pins 7 and the base 1 and outer casing 16. This makes it possible to ensure the required performance while minimizing the possibility of misoperation due to static electricity. That is, the varistor 11 reduces the resistance when a high voltage is applied and provides a connection across the electrode pins 7 and between the electrode pins 7 and the base 1 and outer casing 16. This prevents the resistance on the printed circuit board 8 heating up as a result of a high static electrical voltage acting across the electrode pins 7 or between the electrode pins 7 and the base 1 or outer casing 16. At the same time, when a low voltage electric signal is input to the pair of electrode pins 7, the resistance value of the varistor 11 remains sufficiently high, ensuring the prescribed heating up of the resistance on the printed circuit board 8. Moreover, compared to the conductive resin used in the prior art to form static electricity free parts, the varistor 11 exhibits only around one-third the performance variation, ensuring its reliability. As a result, the above gas generation apparatus is much easier to handle as a separate part, facilitating its assembly in a vehicle safety system or the like.

Also, since the ignition section 100 is formed on the base 1 and the base 1 is provided with a gas generation section 200, the resin cup J and casing K over the ignition section 100, as well as the holder D used to hold the electrode pins 7 in the conventional arrangement are not needed, greatly reducing the number of parts required as well as the manufacturing cost. Moreover, since there is no resin cup J or casing K, the only parts disposed in the outer casing 16 are the hermetic material 10, varistor 11 and printed circuit board 8, all of which are sheet shaped. This enables the volume of the outer casing 16 needed to obtain the required gas pressure to be reduced, particularly with respect to the longitudinal dimension. This enables the apparatus to be made smaller than a prior art apparatus which, in turn, helps to reduce the size of the vehicle safety system in which the apparatus is used. Assuming equivalent functionality, the length of the apparatus of this invention is 78% that of a prior art apparatus and has only around 80% as many parts.

Figure 2:
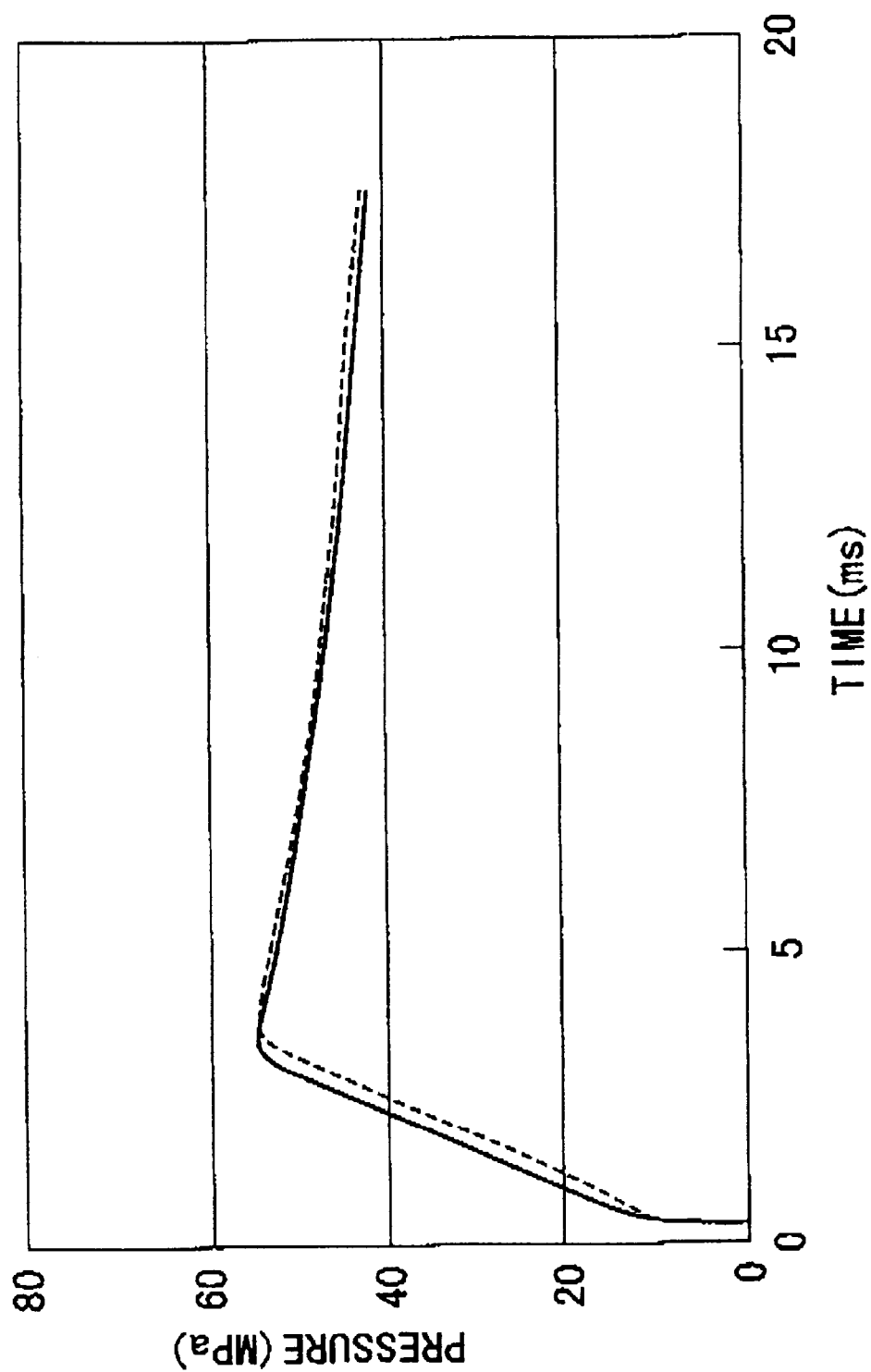
FIG. 2 is a graph that is a plot of gas pressure against time in the electric ignition type gas generation apparatus of FIG. 1.

Furthermore, the fact that the priming charge 14 and the combination of the ignition charge 18 and gas generating material 19 are disposed in a straight line greatly improves the ignitability of the ignition charge 18 and gas generating material 19 by the priming charge 14. The result is that, as shown by the solid line in the graph of FIG. 2, the required gas pressure can be achieved in a shorter time, shortening the time it takes to activate the vehicle safety system to protect the occupants in the event of a crash. For comparison, the broken line shows gas pressure plotted against time in the case of a conventional gas generation apparatus.

Figure 3:
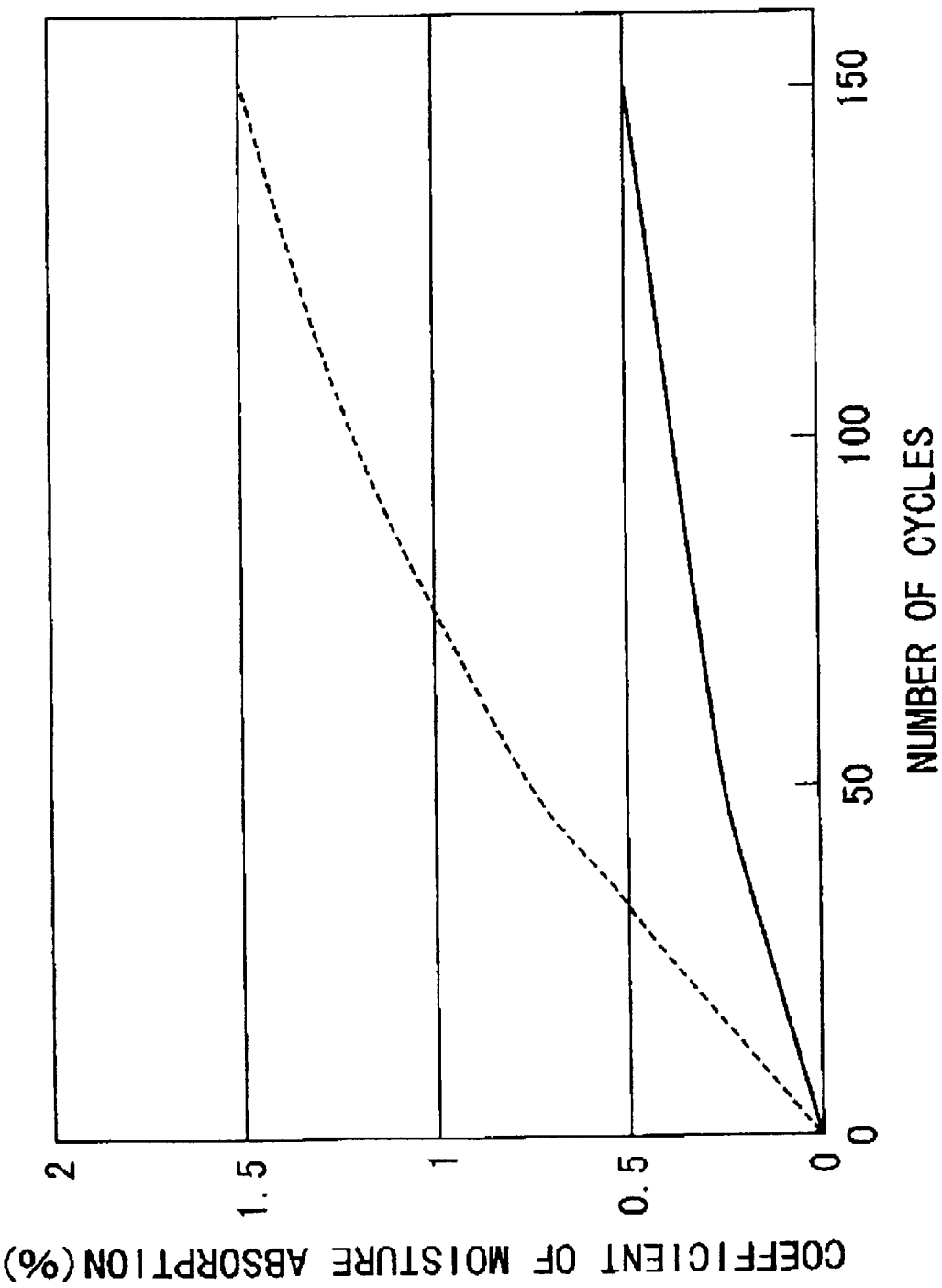
FIG. 3 is a graph showing the result of a moistureproof test of the electric ignition type gas generation apparatus of FIG. 1.

Also, in the gas generation apparatus of this invention, the seal material 9 of unvulcanized rubber provided between the seat 3 of the base 1 and the hermetic material 10 ensures the secure sealing of the gap between the pin insertion holes 6 of the base 1 and the electrode pins 7, improving moistureproofing and pressure resistance properties with respect to the gas generating material 19. FIG. 3 is a graph of the results of a test to check the moistureproof properties with respect to the gas generating material 19. For the test, the gas generation apparatus was exposed for periods of thirty minutes at each of the temperatures 0° C., 20° C., 40° C. and 105° C.; at 20° C. and 40° C. a humidity of 90 to 98% was maintained. The graph was obtained by running the tests a prescribed number of cycles and measuring the coefficient of moisture absorption of each gas generating material 19. The solid line denotes the gas generation apparatus of this invention and the broken line a prior art gas generation apparatus. From the graph, it can be seen that the gas generation apparatus of this invention exhibited much better moistureproof properties than the prior art apparatus using vulcanized seal material P. These results show that even under high humidity, the gas generating material 19 will burn more reliably than that of the prior art.

Figure 4:
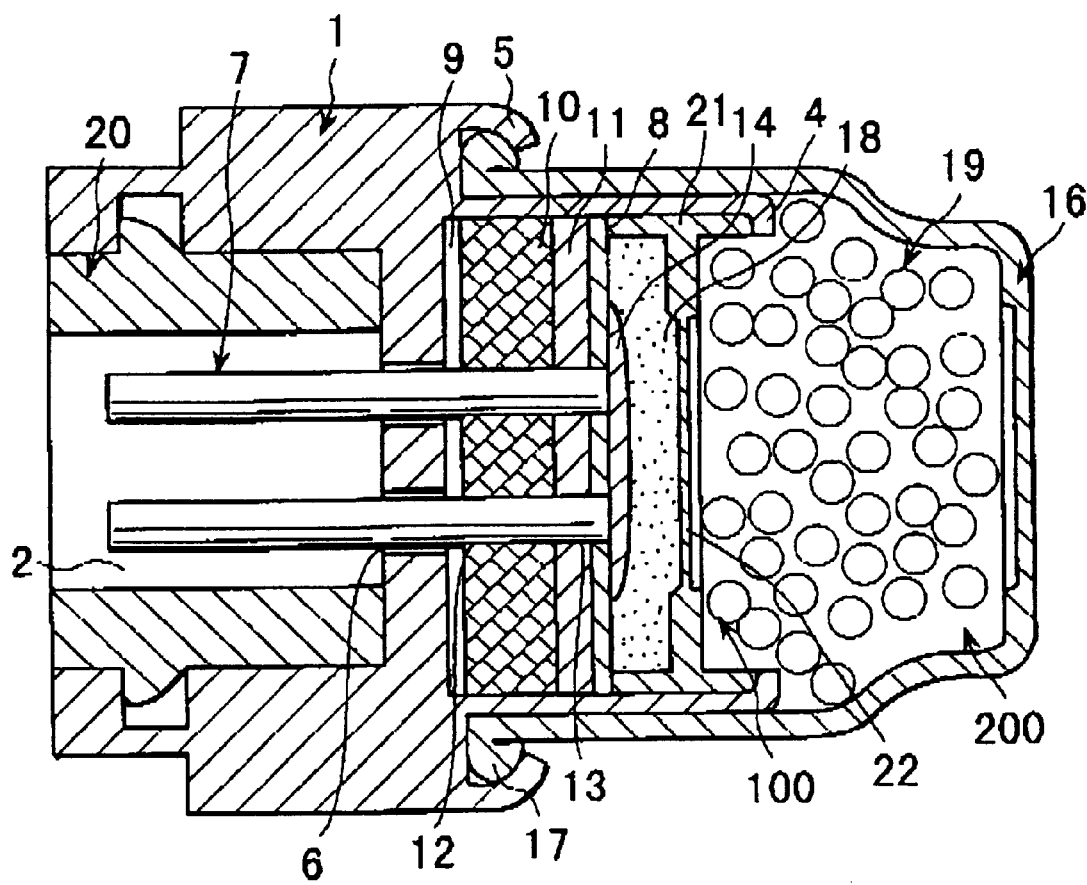
FIG. 4 is a cross-sectional diagram of a second embodiment of the electric ignition type gas generation apparatus of the invention.
Figure 5:
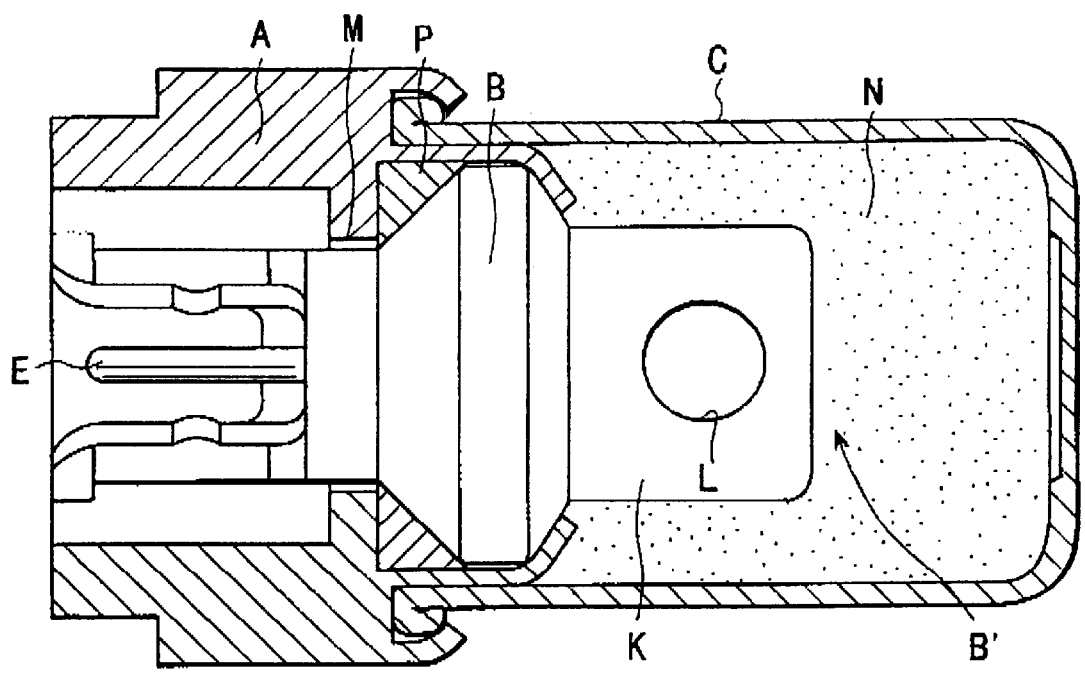
FIG. 5 is a cross-sectional diagram of a conventional electric ignition type gas generation apparatus.
Figure 6:
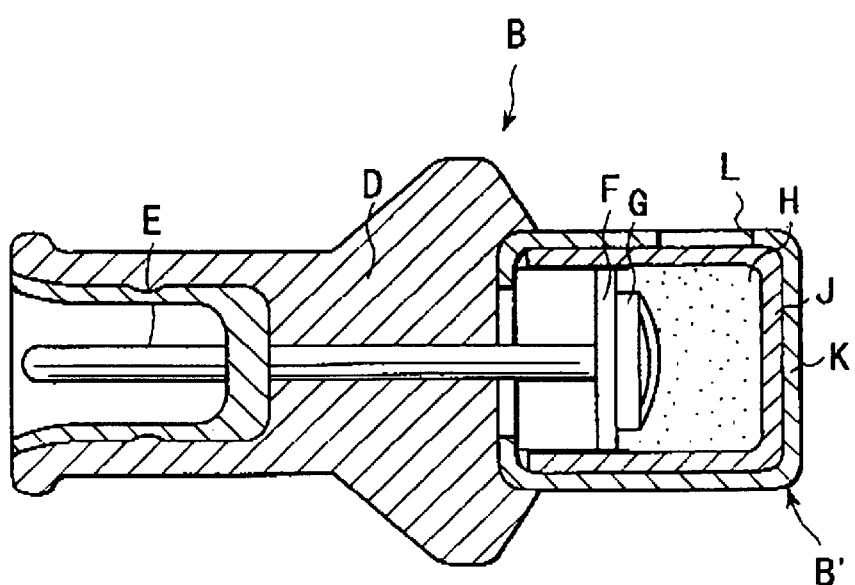
FIG. 6 is a cross-sectional diagram of the electric igniter B incorporated in the gas generation apparatus of FIG. 5.

FIG. 4 is a cross-sectional diagram of a second embodiment of the electric ignition type gas generation apparatus of the invention. As in the case of the first embodiment shown in FIG. 1, this gas generation apparatus shown here is for use with a vehicle safety device such as a seatbelt or airbag or the like. The difference between the apparatuses of the first and second embodiments lies in the arrangement of the ignition charge 18 and gas generating material 19 in the outer casing 16. Specifically, in the gas generation apparatus of the second embodiment, a cover 21 is provided on the upper surface of the printed circuit board 8 on which the priming charge 14 is disposed. The ignition charge 18 is disposed within the cover 21, while the outer casing 16 contains only the gas generating material 19. The cover 21 is cylindrically formed of resin or the like, and has a thin cover portion 22. When the hermetic material 10, varistor 11 and printed circuit board 8 are affixed to the base 1, the cover 21 is affixed to the base 1 by being caulked by the peripheral wall 4 used for attaching the ignition section. Other than this, the configuration is the same as that of the first embodiment and the same reference symbols are used, so further explanation of the details thereof are omitted.

In the case of the gas generation apparatus thus configured, when in a crash the impact is transmitted as an electric signal to the electrode pins 7, the resistance (not shown) between the electrode pins 7 heats up, which ignites the priming charge 14 to thereby set off the ignition charge 18. The ignition of the ignition charge 18 ruptures the cover portion 22 of the cover 21, allowing the flame of the ignition to reach the gas generating material 19, initiating combustion of the gas generating material 19. The gas thus generated ruptures the bottom of the outer casing 16 and is thereby instantaneously released to the outside, instantaneously activating the seatbelt rapid retraction means, airbag or other such vehicle safety system. Because in this gas generation apparatus the ignition charge 18 is disposed on the inside of the cover 21, the flame produced by the ignition of the ignition charge 18 is larger than that produced in the case of the gas generation apparatus of the first embodiment, which makes it possible to ignite the gas generating material 19 more efficiently and instantaneously. Moreover, as the gas generating material 19 does not directly contact the priming charge 14, even if the gas generation apparatus is subjected to vibration, the gas generating material 19 cannot impact against the priming charge 14.

Although the addition of the cover 21 means that the apparatus of the second embodiment has a larger number of parts than the apparatus of the first embodiment, like the first embodiment, it still has far fewer parts than a prior art apparatus and can therefore be manufactured at less cost. Similarly, while the addition of the cover 21 means that the apparatus is that much larger than the apparatus of the first embodiment, it is still smaller than a prior art apparatus. Assuming the same functionality, for example, the length of the apparatus of this invention is 80% that of a prior art apparatus and has only around 80% as many parts. The apparatus of the second embodiment also exhibits the same moistureproofing and pressure resistance properties as the first embodiment.

While the first and second embodiments have each been described with reference to a gas generation apparatus applied to a vehicle safety system, the apparatus can also be applied to a safety device such as an airbag device for protecting people from the shock of falls, rolling and other such crash impacts. Similarly, while in the above embodiments a varistor is used to improve resistance to static electricity, the invention is not limited to the use of a varistor. Instead, conductive resin or the like may be used for the purpose where the use of such material does not pose a problem. Also, to reduce costs, for the hermetic material there may be used conductive resin containing lead wires.

Thus, as described in the foregoing, the apparatus according to this invention comprises an ignition section formed on an apparatus base, and a gas generating section provided on the base with the gas generating section covering the ignition section. This enables the number of parts, the manufacturing cost and the size of the apparatus to be reduced. Therefore, when applied to a rapid retraction device of a seatbelt or an airbag or other such vehicle safety device, or to an airbag device used to protect people from the shock of falls, rolling and other such crash impacts, it enables the cost and size of such devices to be reduced. Also, using a varistor to provide a connection between the electric input portions of the ignition section and using unvulcanized rubber as a seal material for the gas generating section improves the reliability of the apparatus by improving the resistance to static electricity and the moistureproof properties.

Obviously, numerous modifications and variations of the present invention are possible in light of the above teachings. It is therefore to be understood that within the scope of the appended claims, the invention may be practiced otherwise than as specifically described within.

What is claim is:

1. An electric ignition type gas generation apparatus comprising:

a base of metal;

an ignition section provided on said base of metal;

a gas generation section provided on said base of metal for covering said ignition section; and a seal material interposed between said base of metal and said ignition section for sealing said gas generation section.

2. The electric ignition type gas generation apparatus according to claim 1, wherein said ignition section includes a pair of electrical signal input portions and said pair of electrical signal input portions are connected to each other by a varistor.

* * * * *